United States Patent [19]
Parker

[11] Patent Number: 4,616,932
[45] Date of Patent: Oct. 14, 1986

[54] METHOD OF OBSERVING CHANGE IN A SHAPE

[75] Inventor: Richard J. Parker, Derby, England

[73] Assignee: Rolls-Royce plc, London, England

[21] Appl. No.: 651,853

[22] Filed: Sep. 18, 1984

[30] Foreign Application Priority Data

Nov. 1, 1983 [GB] United Kingdom ............... 8329161

[51] Int. Cl.$^4$ .......................................... G01B 11/24
[52] U.S. Cl. ................................. 356/376; 356/426
[58] Field of Search .............. 356/23, 373, 375, 376, 356/394, 398, 426

[56] References Cited

U.S. PATENT DOCUMENTS 4,049,644  9/1977  Wennerstrom .................... 356/373
4,060,329  11/1977  Ellis ..................................... 356/373

FOREIGN PATENT DOCUMENTS 139008  8/1983  Japan ................................. 356/375

*Primary Examiner*—F. L. Evans
*Attorney, Agent, or Firm*—Cushman, Darby & Cushman

[57] ABSTRACT

Gas turbine engine compressor blades tend to untwist and decamber when subjected to working loads. Previous methods of observing the phenomenum and recording the magnitude of distortion have been restricted to the blade outer extremity, and to delayed display of the results. The invention provides a laser beam which is movable lengthwise of the blades and which effectively traverses each blade in a chordal direction. Photo devices pick up the light spot on each blade in turn and the signals produced are combined with signals representative of the speed of revolution of the blades and passed to an oscilloscope e.g. which immediately displays the shape of the blades.

6 Claims, 4 Drawing Figures

METHOD OF OBSERVING CHANGE IN A SHAPE

The present invention relates to a method of observing the change if any, in the shape of a member, when the member is subjected to working loads. The loads referred to may e.g. comprise liquid thrust loads on a rotating ships propeller. Alternatively the loads may comprise air loads on gas turbine engine compressor blades which are rotating in that medium.

It is known to observe the changes in profile of the radially outer tips of compressor blades as they rotate. The observations are achieved on the one hand by the use of close proximity sensors and on the other hand by photographic means. Both have the draw back of only being able to observe the blade tip. The shape of the blade between tip and non changing root is a matter for conjecture.

The present invention seeks to provide an improved method of observing the changes in the shape of a member rotating in a working medium.

According to the present invention, a method of observing change in the shape of a bodily rotating blade comprises the steps of directing a collimated light beam onto the blade at such an angle relative to a flank of the blade as to enable traversing of the flank by the collimated light beam in a direction chordally of the blade as it rotates, exposing a light sensitive, signal generating means to the resulting light spot at the point of contact between beam and blade and using signals generated by the exposure in conjunction with means which relates the rotational speed of the blade with the generation of signals, to produce a visual display of the blade shape on display means.

Preferably the method includes the step of directing a laser beam onto the blade.

The method includes directing the laser beam onto the blade along a path parallel with the axis about which the blade bodily rotates.

Preferably the method includes positioning the light sensitive, signal generating means radially outwardly of the arc of rotation of the blade and arranging focussing means between the blade tip and the light sensitive, signal generating means for the purpose of focussing the light spot at the point of contact between the laser beam and the blade onto the light sensitive, signal generating means.

The method may include displacing the laser beam in a direction lengthwise of the blade so as to enable successive chordal portions of the blade to be observed.

Preferably the method includes the step of maintaining the laser beam parallel with the axis of rotation of the blade whilst displacing the beam lengthwise thereof.

The invention will now be described by way of example and with reference to the drawings in which.

Figure 1:
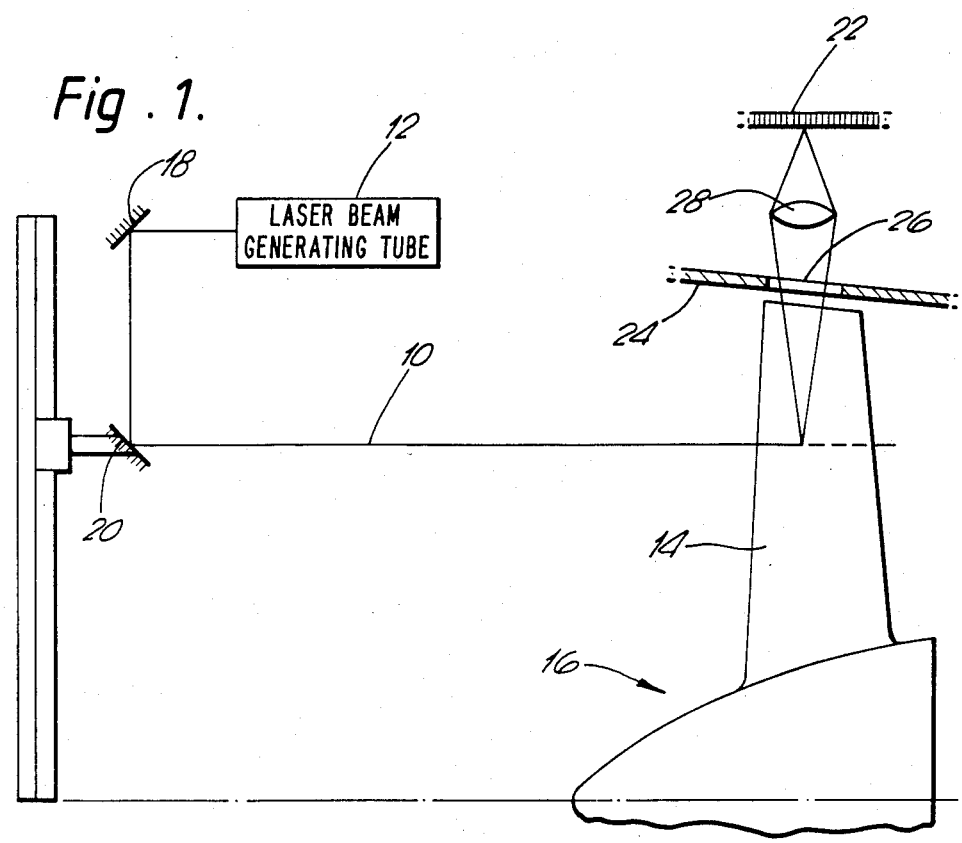
FIG. 1 depicts apparatus with which to effect one mode of the present invention.

Referring to FIG. 1. A laser beam 10 is generated in a tube 12 containing helium and neon and is directed onto a stage of compressor blades 14 in a gas turbine engine 16, only part of which is shown.

Mirrors 18 and 20 are arranged so as to deflect the beam 10 along a path parallel with the axis of rotation of the compressor blades 14. A light sensitive device 22 is positioned externally of the compressor casing 24, in radial alignment with the stage of blades 14. A window 26 is provided in the compressor casing wall and a focussing lens 28 placed between the window 26 and the light sensitive device 22.

The light sensitive device 22 in this first example is an array of light sensitive diodes which is of sufficient length to embrace the length of the focussed image of the blades 14, and the lens 28 is positioned so as to focus light which is scattered at the point of contact of the beam 10 and blade 14, onto the diode array.

Each blade 14 is twisted about a longitudinal line in known manner, so as to impart motion to the atmosphere in which it rotates, the motion being generally parallel to the axis of rotation of the blades 14. The beam 10 thus contacts each blade 14 in turn at its leading edge and effectively chordally traverses a flank of each blade 14 as the blades rotate.

Each blade 14 is cambered (see FIG. 3) in known manner.

In operation of the present example, as each blade 14 passes through the laser beam 10, its twist causes the focussed light to be displaced longitudinally of the array of diodes 22. As each diode 22 senses the light spot, a signal is generated, which is passed to a computer/recording means (not shown in FIG. 1) shown as 23 in FIG. 2 which may be a print out device and/or an oscilloscope. The former will provide digital information as to the blade shape and the latter a pictorial representation thereof.

It will be appreciated that, as there is not relative movement between the laser beam 10 and the array of diodes 22, the light spots from a given blade 14 will trace out a straight line over the array of diodes 22 as the light spot effectively moves over the blade surface from leading edge to trailing edge, despite the fact that the blade 14 is cambered. It follows that the angular position of a blade 14 which is being observed, must be noted each time a diode 22 generates a signal which is to be recorded. Thereafter, the relative lateral position of any two consecutively observed points on the diodes 22 may be computed by the computer/recorder 23 and hence their relative angular displacement $\alpha$ (see FIG. 3).

The resolution of the observed shape depends primarily on the number of light points which can be directed onto the diode array 22 from each blade 14 as it passes the laser beam 10. The output from the diode array is in turn, governed by the number of times the output receiving means (not shown in FIG. 1) can receive the output signals during the passing of any given blade 14 through the laser beam 10.

The formulae upon which the computation is based is as follows:

$$n = \frac{fc}{Ne \cdot w \cdot N_B} \quad (1)$$

where n is the number of resolved light points.

fc is the clock frequency of the diode array.

Ne is the number of elements in the diode array.

w is the speed of rotation of the stage of blades.

$N_B$ is the number of blades in the stage.

Figure 2:
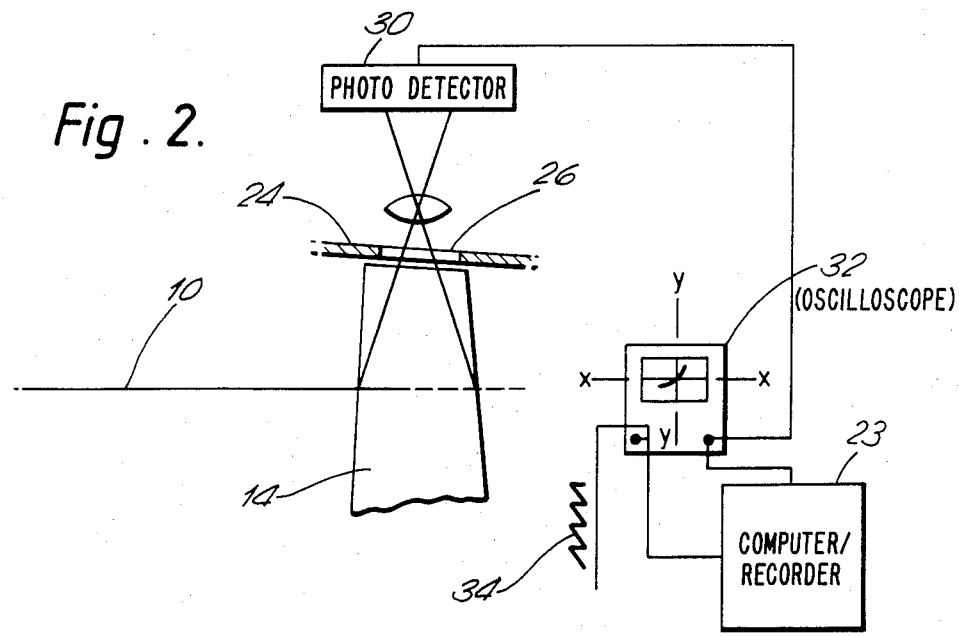
FIG. 2 depicts apparatus with which to effect an alternative mode of the present invention.

Referring to FIG. 2 in which like parts have like reference numerals.

A single photodetector 30 is arranged radially outwardly of the stage of blades 14 and a window 26 is provided in the casing 24, through which light from each blade 14 may pass and so reach the photodetector 30.

The photodetector 30 is a single element of known kind which produces two continuous voltage signals which vary with the position of a spot of light received by the photo detector 30 from a blade 14.

The photodector 30 is capable of generating signals which when applied to an oscilloscope 32, produces a straight line which is representative of the chordal length of a blade 14. If however, the signals are applied to the y axis of a graticule on an oscilloscope 32 and a means such as a time ramp 34 is adapted by way of synchronising its output to the speed at which the blades 14 pass the laser beam 10, and is connected to the $\chi$ axis of the graticule, an instant pictorial representation of the true shape of each blade 14 is produced on the oscilloscope 32.

The formula $$n = \frac{fc}{Ne \cdot w \cdot N_B}$$

also applies to the method depicted in FIG. 2 and it will be appreciated that, as the photodetector 30 consists of a single element, Ne will equal one.

Figure 3:
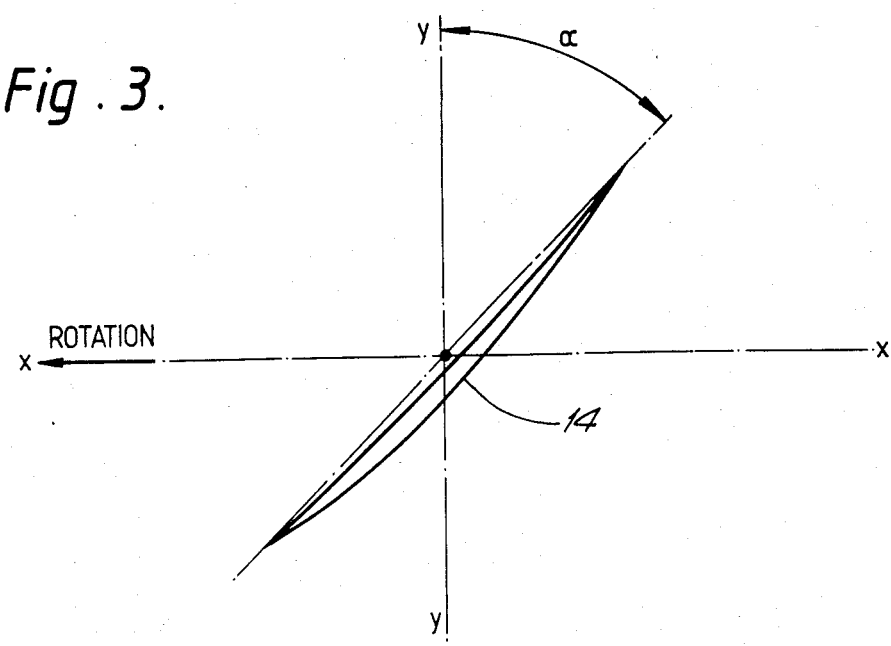
FIG. 3 is a view on line 3—3 of FIG. 2.

Referring now to FIG. 3 which is representative of a section through a blade in the method illustrated in FIG. 1 as well as that depicted by FIG. 2. With regard to the first described example of the invention, the accuracy with which each signal is measured is defined by Ne, the number of diode elements in the array 22. The accuracy of measurement in the second example depends on the precision with which the output voltages from the signle element 30 are measured.

The formula for calculation the magnitude of the angle $\alpha$ i.e. the twist of a blade 14 is expressed as follows:

$$\alpha = \frac{\tan^{-1}\chi \pm e}{y} \quad (2)$$

where e is the error.

It is assumed that y, the time for measurement can be determined with far more accuracy than the position of the light spot on the array of diodes. Therefor only the error e in $\chi$ is considered.

For the purpose of effecting the methods of the present invention, the treatment of errors is taken from the teaching in the publication "Errors in Observation and their Treatment" 1962 (Third Edition) Chapman and Hall, London. Author S Topping.

If n points are measured on a given section of a blade 14, an estimate of angle $\alpha$ may be made for each point, thus reducing the overall error when the estimates are averaged. (a least square approach is assumed). It can be shown that the expected error is given by the formula $$2 = \frac{\Sigma w_s^2 \epsilon_s^2}{(\Sigma w_s)^2} \quad (3)$$

where $\epsilon_s$ is the error in measurement of tan $\alpha$ for each individual measurement and $w_s$ is the weighting attached to each measurement.

The individual error $\epsilon_s$ is given by the formula $$\epsilon_s = \frac{n}{Ne^s} \quad (4)$$

If the weighting of $1/\epsilon_s^2$ is assumed, then equation 3 simplifies to $$\epsilon = \sqrt{\frac{1}{\Sigma 1/\epsilon_s^2}} \quad (5)$$

Using equation 5 and taking $\alpha=45°$ which will maximise the errors, the following table of expected errors was computed. The values represent the error in measured twist angle $\alpha$, expressed in degrees.

|     | Ne    |       |       |       |
| --- | ----- | ----- | ----- | ----- |
| n   | 64    | 128   | 256   | 512   |
| 25  | 0.15  | 0.08  | 0.04  | 0.02  |
| 50  | 0.11  | 0.05  | 0.03  | 0.014 |
| 100 | 0.08  | 0.04  | 0.02  | 0.010 |
| 250 | 0.05  | 0.024 | 0.015 | 0.006 |

The table indicates that increasing Ne so as to provide more accurate positioned observation of the light spots, is more effective than is the case when increasing n.

Figure 4:
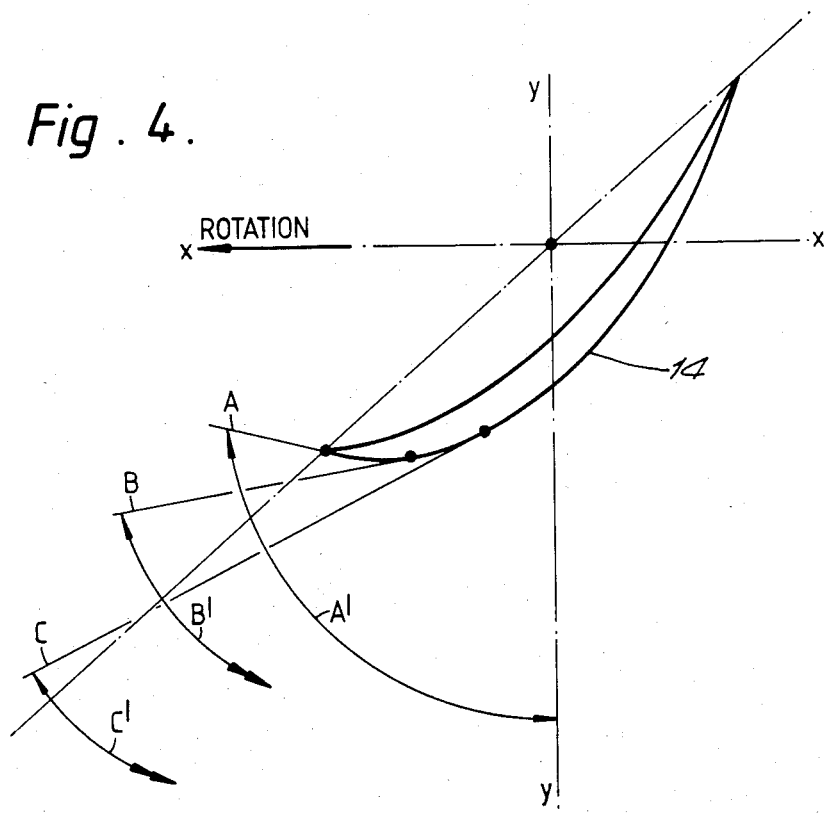
FIG. 4 is a repeat of FIG. 3 in exaggerated form.

Referring now to FIG. 4. To measure the magnitude of decamber of a blade 14, n, the number of points resolved must be large. Straight lines e.g. A, B and C are projected tangential to the curvature of the flank which receives the laser beam 10, from the points n which are resolved. The respective angles A', B' and C' defined by lines A B and C and the y axis will decrease as the blade 14 decamber under working loads.

Use of the formulae described hereinbefore, will enable an accurate assessment of the magnitude of decamber to be made.

Referring back to FIG. 1. The mirror 20 is slidably mounted on a column 50, which in turn is arranged normal to the axis of rotation of blade 14. The mirror 20 may thus be moved yet still maintain the laser beam 10 parallel with the axis of rotation of blade 14. By this means any desired chordal section of blade 14 may be traversed by the laser beam 10.

The mirror 20 may be pivotaly mounted, so as to traverse the blade 14 from a fixed point. However, the true chordal width of the blade 14 would not be traversed by the beam 10, except in a mean position.

I claim:

1. A method of observing change in the shape of a bodily rotating blade comprising the steps of:
   directing a collimated beam of light onto the blade at such an angle relative to a flank of the blade as to enable traversing of the flank by the light beam in a direction chordally of the blade as it rotates;
   exposing a light sensitive, signal generating means to the resulting light spot at the point of contact between the beam and the blade to generate exposure signals;
   simultaneously using a means to derive signals representative of the rotational speed of the blade;
   and using signals generated by the exposure in conjunction with signals which relate the rotational speed of the blade with the generating said signals, to produce a visual display of the blade shape on display means.

2. A method of observing change in the shape of a bodily rotating blade as claimed in claim 1 including the step of directing a laser beam onto the blade.

3. A method of observing change in the shape of a bodily rotating blade as claimed in claim 1 wherein the beam is directed onto the blade along a path parallel with the axis of rotation about which the blade bodily rotates.

4. A method of observing change in the shape of a bodily rotating blade as claimed in claim 1 including the step of positioning the light sensitive, signal generating means radially outwardly of the arc of rotation of the blade and arranging focussing means between the blade tip and the light sensitive, signal generating means for the purpose of focussing the light spot at the point of contact between the beam and the blade onto the light sensitive, signal generating means.

5. A method of observing change in the shape of a bodily rotating blade as claimed in any previous claim including the step of displacing the beam lengthwise of the blade so as to enable successive chordal portions of the blade to be observed.

6. A method of observing change in the shape of a bodily rotating blade as claimed in claim 5 including the step of maintaining the beam parallel with the axis about which the blade bodily rotates while displacing the beam lengthwise of the blade.

* * * * *